US011938603B2

(12) United States Patent
Ricordi et al.

(10) Patent No.: US 11,938,603 B2
(45) Date of Patent: Mar. 26, 2024

(54) GAS-OPERATED FIXING TOOL AND METHOD OF OPERATING IT

(71) Applicant: Illinois Tool Works Inc., Glenview, IL (US)

(72) Inventors: Christian Ricordi, Glenview, IL (US); Olivier Baudrand, Glenview, IL (US)

(73) Assignee: Illinois Tool Works Inc., Glenview, IL (US)

(*) Notice: Subject to any disclaimer, the term of this patent is extended or adjusted under 35 U.S.C. 154(b) by 98 days.

(21) Appl. No.: 17/277,675

(22) PCT Filed: Sep. 9, 2019

(86) PCT No.: PCT/US2019/050171
§ 371 (c)(1),
(2) Date: Mar. 18, 2021

(87) PCT Pub. No.: WO2020/072174
PCT Pub. Date: Apr. 9, 2020

(65) Prior Publication Data

US 2021/0354279 A1 Nov. 18, 2021

(30) Foreign Application Priority Data

Oct. 1, 2018 (FR) ...................................... 1859058

(51) Int. Cl.
*B25C 1/00* (2006.01)
*B25C 1/14* (2006.01)
*B25C 1/18* (2006.01)

(52) U.S. Cl.
CPC . *B25C 1/14* (2013.01); *B25C 1/18* (2013.01)

(58) Field of Classification Search
CPC .... B25C 1/14; B25C 1/18; B25C 1/08; B25C 1/06
See application file for complete search history.

(56) References Cited

U.S. PATENT DOCUMENTS 3,850,359 A 11/1974 Obergfell
5,720,423 A * 2/1998 Kondo ...................... B25C 1/06 227/132

(Continued)

FOREIGN PATENT DOCUMENTS

EP 2 433 753 3/2012
EP 2 851 157 3/2015

OTHER PUBLICATIONS

International Search Report and Written Opinion from International Patent Application No. PCT/US2019/050171, dated Dec. 12, 2019 (13 pages).

*Primary Examiner* — Andrew M Tecco
(74) *Attorney, Agent, or Firm* — Neal, Gerber & Eisenberg LLP

(57) ABSTRACT

Gas-operated fixing tool including a working chamber, a piston mounted slideably in the working chamber and comprising a driving rod of which a first longitudinal end is configured to drive a fixing element and of which a second longitudinal end is connected to a head which separates the working chamber into a first portion and into a second portion which is traversed by the rod, and at least one combustion chamber in which a mixture of air and fuel is intended to be burnt in order that combustion gases generate a rise in pressure that causes a movement of the piston in the working chamber, wherein the at least one combustion chamber is in fluid communication with the second portion in such a way that the rise in pressure causes the movement and the return of the piston into a rest position ready for firing a fixing element.

10 Claims, 4 Drawing Sheets

(56) References Cited

U.S. PATENT DOCUMENTS

| | | | |
|---|---|---|---|
| 7,584,723 B2 | 9/2009 | Shkolnikov et al. | |
| 8,763,874 B2* | 7/2014 | McCardle | B25C 1/06 227/129 |
| 9,492,915 B2 | 11/2016 | Largo et al. | |
| 9,638,092 B2 | 5/2017 | Adams | |
| 9,770,818 B2 | 9/2017 | Largo | |
| 2002/0134345 A1 | 9/2002 | Adams | |
| 2002/0144498 A1 | 10/2002 | Adams | |
| 2004/0182907 A1 | 9/2004 | Dittrich | |
| 2008/0237295 A1 | 10/2008 | Adams | |
| 2008/0314952 A1* | 12/2008 | Tamura | B25C 1/08 227/10 |
| 2009/0236387 A1* | 9/2009 | Simonelli | B25F 5/006 227/8 |
| 2011/0198381 A1* | 8/2011 | McCardle | B25C 1/047 227/8 |
| 2013/0048696 A1 | 2/2013 | Largo et al. | |
| 2015/0047608 A1* | 2/2015 | Ricordi | B25C 1/08 123/429 |
| 2015/0102084 A1 | 4/2015 | Zhao | |
| 2016/0144497 A1 | 5/2016 | Boehm et al. | |
| 2018/0036871 A1 | 2/2018 | Cordeiro et al. | |
| 2018/0085905 A1* | 3/2018 | Adams | B25C 1/08 |

* cited by examiner

GAS-OPERATED FIXING TOOL AND METHOD OF OPERATING IT

PRIORITY

This application is a national stage application of PCT/US2019/050171, filed on Sep. 9, 2019, which claims priority to and the benefit of French Patent Application No. 1859058, filed Oct. 1, 2018, the entire contents of each of which are incorporated herein by reference.

FIELD

The present disclosure concerns a gas-operated fixing tool, such as a nail driving tool for example, and a method of operating such tool.

BACKGROUND

The present disclosure concerns so-called gas-operated fastening or fixing tools, that is to say tools including an internal combustion engine operating by ignition in a combustion chamber of an air-fuel mixture, the fuel being injected into the chamber by an injection device from a fuel container termed a gas cartridge. Tools of this kind are intended to drive fixing elements into substrate materials to fix components thereto. Gas-operated nail driving tools are nowadays in very widespread use. By way of fuel for an internal combustion engine there may be cited for example butane, propane, etc. in liquid and/or gas form.

A tool of this kind is generally portable and includes a casing in which is mounted the internal combustion engine for propelling a piston for driving a fixing element. A tool of this kind may also include an electrical power supply battery as well as a holding, manipulation and firing handle on which is mounted a trigger for actuating the tool.

A firing cycle comprises a plurality of steps such as the distribution of a quantity of fuel by the cartridge, the admission of the fuel into the chamber, the mixing of the fuel with air in the chamber, the ignition and combustion of the mixture to drive the piston, and the evacuation of the combustion gases from the chamber.

In various known fastener driving tools, the piston is mounted in a working chamber and includes a drive rod a first longitudinal end of which is configured to drive a fixing element and a second longitudinal end of which is connected to a head that divides the working chamber into two portions. A first of these portions is intended to receive the combustion gases coming from the combustion chamber in order to drive the piston from its rest position to its working or firing position. The piston rod passes through a second portion of the working chamber.

In this first (gas-operated) fixing tool technology, the piston is returned automatically from its working position to its rest position. In fact, the reduced pressure generated in the first portion of the working chamber because of the firing and the movement of the piston is sufficient to exert a suction return force on the piston so that it returns to its rest position.

However, this type of gas-operated fixing tool has a disadvantage linked to the fact that firing quality is strongly linked to the climatic conditions in which the tool is used. In fact, the climatic conditions influence the combustion of the air-fuel mixture. The air that is mixed with the fuel comes from the surrounding air and the variation in the density of the air linked for example to the temperature or to the altitude can have a negative effect on the quality of the combustion in the combustion chamber. Moreover, if the tool heats up because of a plurality of successive firings, the performance of the internal combustion engine and therefore of the tool may decrease.

To solve this problem manufacturers of fixing tools also offer tools with no internal combustion engine. These fixing tools are configured to fire fixing elements by pneumatic or mechanical energy.

In the case of pneumatic actuation, the aforementioned first portion of the working chamber is generally connected to a source of gas under pressure, such as compressed air. Feeding this first portion with gas under pressure causes the piston to move from its rest position to its working position and fires a fixing element.

In the case of mechanical actuation, a compression spring is mounted in the first portion of the working chamber and is configured to urge the piston from its rest position to its working position to fire a fixing element.

This other (pneumatic or mechanical) fixing tool technology employs a gear motor, that is to say an electric motor associated with a reduction gear, to return the piston from its working position to its rest position. The gear motor and its power supply battery are heavy and bulky however.

The present disclosure proposes an improvement to the existing technologies that makes it possible to solve at least some of the problems referred to above.

SUMMARY

The present disclosure concerns a gas-operated fixing tool, comprising:

- a working chamber,
- a piston mounted slideably in the working chamber and comprising a driving rod of which a first longitudinal end is configured to drive a fixing element and of which a second longitudinal end is connected to a head which separates the said working chamber into a first portion and into a second portion which is traversed by the said rod, and
- at least one combustion chamber in which a mixture of air and fuel is intended to be burnt in order that combustion gases generate a rise in pressure which causes a movement of the piston in the working chamber,
- characterized in that the said at least one combustion chamber is in fluid communication with the said second portion in such a way that the rise in pressure causes the movement and the return of the piston into a rest position ready for firing a fixing element.

The present disclosure proposes an optimum compromise between the two technologies described above. The tool according to the present disclosure may be considered to conform to the first technology since it is of the gas-operated type, that is to say it comprises an internal combustion engine or to be more precise a combustion chamber in which an air-fuel mixture is intended to be burned and to generate combustion gases increasing the pressure in the combustion chamber. However, in contrast to the prior art, these combustion gases and this increase in pressure in the combustion chamber are not used for firing, that is to say for moving the piston from its rest position to its working position, but on the contrary to move the piston to its rest position. An internal combustion engine is lighter and less bulky than a gear motor and its power supply battery. Replacing the gear motor by an internal combustion engine is therefore advantageous. The tool may furthermore utilize the second technology to fire a fixing element, that is to say that firing may be obtained using pneumatic or mechanical energy. In this case, even the climatic conditions are not the optimum for the operation of the internal combustion engine of the tool, these conditions will have no influence on firing a fixing element. In conclusion, the compromise proposed by the present disclosure makes it possible to benefit from the advantages of the aforementioned two technologies without their disadvantages.

The tool according to the present disclosure may include one or more of the following features or steps, separately or in combination:

- the tool is devoid of direct fluid communication between the said at least one combustion chamber and the said first portion;
- the said first portion contains an elastically deformable member which is configured to:
  - be elastically compressed by the piston during its movement to its rest position, and
  - by elastic expansion, urge the said position from its rest position to a working position and thus lead to a fixing element being fired;
- the said first portion is in fluid communication with a pressurized and non-flammable gas source in order to ensure the movement of the piston from its rest position to a working position;
- the tool comprises an element for blocking the piston in its rest position;
- the said second portion comprises at least one elastic stop for damping the piston at the end of travel during a firing operation;
- the said at least one combustion chamber comprises a propeller;
- the said propeller is fixed in rotation;
- the said propeller is free to rotate or configured to be driven in rotation by a motor;
- the said at least one combustion chamber comprises a spark plug and is connected to a fuel cartridge;
- the said second portion and/or the said at least one combustion chamber comprise or comprises a vent for fresh air venting and for optionally discharging combustion gases; and
- the said first and second portions are in fluid communication via at least one duct equipped with a valve and configured such that the pressurized air contained in the said first portion, and resulting from the movement of the piston to its rest position, is at least partially discharged into the said second portion or even into the said at least one combustion chamber.

The present disclosure further concerns a method for operating a gas-operated fixing tool according to any one of the above described tools, characterized in that it comprises the steps of:

a) moving the piston from its rest position to a working position and driving a fixing element by the rod of the piston, b) igniting an air and fuel mixture in the said at least one combustion chamber and generating combustion gases causing a rise in pressure resulting in a movement of the piston to its rest position.

The method according to the present disclosure may include one or more of the following features or steps, separately or in combination:

- before the step a), a step of releasing the piston and/or a step of supplying the first portion of the working chamber with a pressurized and non-flammable gas,
- after the step b), a step of discharging the combustion gases from the said at least one combustion chamber by purging by means of ambient air or air from the said first portion,
- after the step b), a step of blocking the piston in its rest position,
- during the step a), supplying the said at least one combustion chamber by gases expelled from the said second portion owing to the movement of the piston from its rest position to its working position, and/or
- during the step a), setting the gases in rotation or creating turbulence in the said at least one combustion chamber.

BRIEF DESCRIPTION OF THE FIGURES

The present disclosure will be better understood and other details, features and advantages of the present disclosure will become more clearly apparent on reading the following description given by way of nonlimiting example and with reference to the appended drawings, in which.

DETAILED DESCRIPTION

Figure 1:
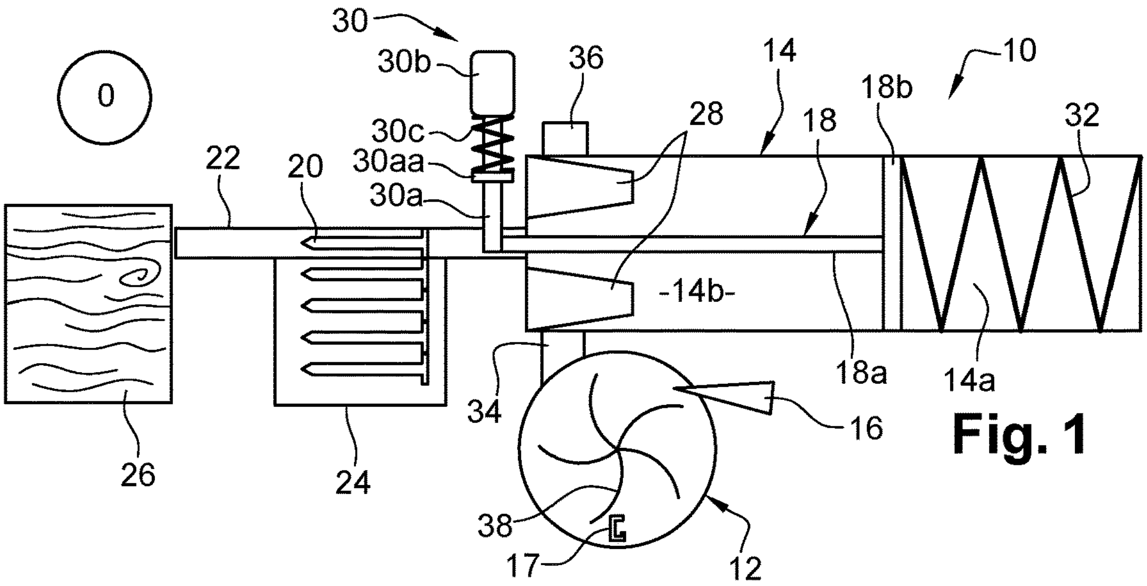
FIGS. 1 to 5 are highly diagrammatic part-sectional views of a gas-operated fixing tool according to the present disclosure and illustrate steps of the method of operating it.

FIGS. 1 to 5 illustrate a first embodiment of a fixing tool 10 according to the present disclosure.

The fixing tool 10 is highly diagrammatically and partially represented in the drawings. This tool 10 includes a casing (not shown) in which is located an internal combustion engine equipped with at least two chambers: a combustion chamber 12 and a working chamber 14. A variant embodiment could include an additional pre-combustion chamber.

The combustion chamber 12 is intended to receive a mixture of air and fuel. Fuel 16 is fed via an injection member from a fuel gas cartridge (not shown). In practice, the combustion chamber 12 receives an air-fuel mixture ignited by a spark plug 17 or the like.

Figure 3:
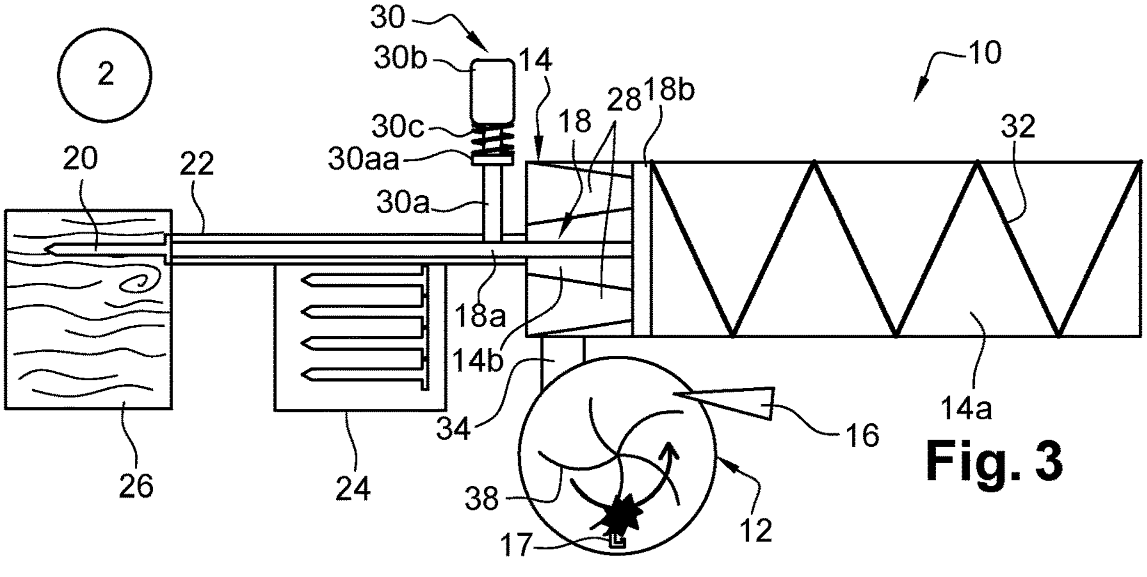

A drive piston 18 is mounted in the working chamber 14 to slide from a rest position shown in FIG. 1 to a working position shown in FIG. 3 and vice-versa. Firing means movement of the piston 18 from its rest position to its working position and driving a fixing element 20, which is a nail in the example shown but could be of some other type, such as a clip for example.

The piston 18 includes a drive rod **18*a* a first longitudinal end of which is configured to drive a fixing element 20 and a second longitudinal end of which is connected to a head 18*b* that divides the working chamber 14 into a first portion 14*a* and a second portion 14*b*. The portions 14*a* and 14*b* are coaxial. The rod 18*a* passes through the second portion 14*b* and extends as far as a tip 22 of the tool through which the fixing element 20** is fired.

The fired fixing element 20 is extracted from a feed magazine 24 and is intended to be anchored into a substrate material 26 when it exits the tip 22 of the tool. Although this cannot be seen, the casing of the tool 10 includes a handle for holding and manipulating the tool. The handle is also used for firing by way of an actuator trigger mounted on it. All these components of gas-operated fixing tools are known to the person skilled in the art and therefore have not all been represented in the drawings.

The second portion 14*b* of the working chamber 14 includes one or more elastic abutments 28 for damping the piston at the end of travel upon firing (FIG. 3).

The tool 10 further includes an element 30 for immobilizing the piston 18 in its rest position shown in FIG. 1. In the example shown this member 30 is located at the level of the tip 22 of the tool and comprises a mobile finger 30*a*. This finger 30*a* is mobile between a deployed position shown in FIGS. 1 and 5 and a retracted position shown in FIGS. 2 to 4. In the deployed position, the finger 30*a* extends in front of the free end of the rod 18*a* of the piston 18. This end bears on the finger 30*a* which therefore immobilizes the piston 18 in its rest position. In the retracted position, the finger 18 is retracted relative to the rod 18*a* of the piston 18 which is therefore free to move in the working chamber 14. The finger 30*a* may be moved by an actuator (not shown) controlled by a controller (not shown) of the tool 10. Here the finger 30*a* is mounted to slide on a support 30*b* and urged into its deployed position by a compression coil spring 30*c* mounted around the finger 30*a* and extending between the support 30*b* and an annular flange 30*aa* of the finger.

In the example shown, firing is brought about by mechanical energy that here is supplied by an elastically deformable member 32 housed in the first portion 14*a* of the working chamber.

The member 32 extends between the head 18*b* of the piston 18 and a rear end of the working chamber 14 opposite the tip and is elastically deformable in compression in a direction parallel to the direction of movement of the piston 18.

Figure 7:
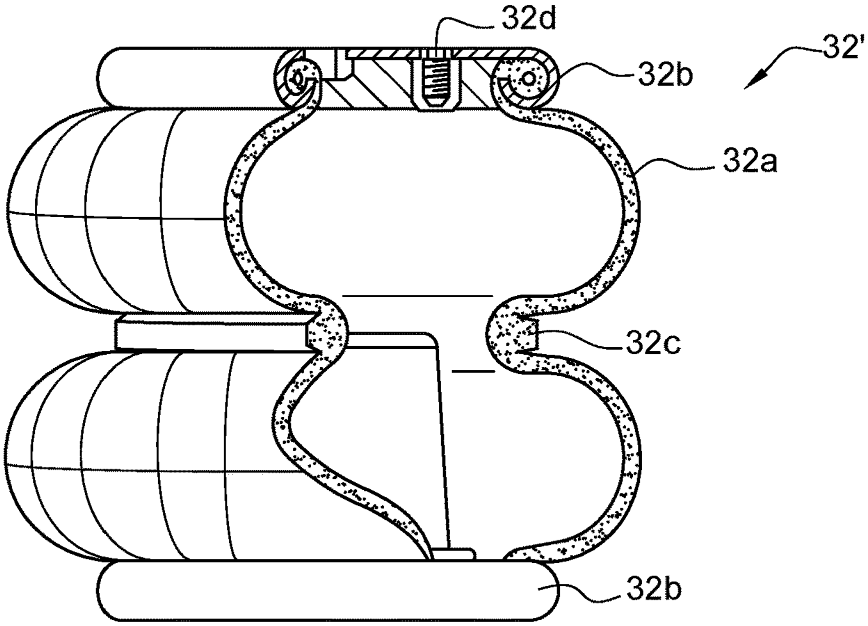
FIG. 7 is a partially cutaway diagrammatic perspective view of an elastically deformable member for a tool according to the present disclosure.

In the example shown, this member 32 is diagrammatically represented as a compression coil spring but this embodiment is not limiting on the present disclosure. FIG. 7 shows, for example, a variant embodiment of the member 32 that is formed by a bellows 32'. The bellows 32' comprises a tubular elastic membrane 32*a* the axial ends of which are closed by transverse plates 32*b*. The membrane 32*a* is surrounded by one or more rings 32*c* which define between them and with the plates 32*b* compressible portions of the membrane. The bellows 32' encloses a gas under pressure that can be injected via a port 32*d* of one of the plates 32*b*. The bellows 32' functions in a similar way to a compression spring.

The member 32 is advantageously configured:

- to be compressed elastically by the piston 18 when it moves to its working position, and
- by elastic expansion, to urge the piston 18 from its rest position to a working position and thereby to fire a fixing element 20.

Figure 2:
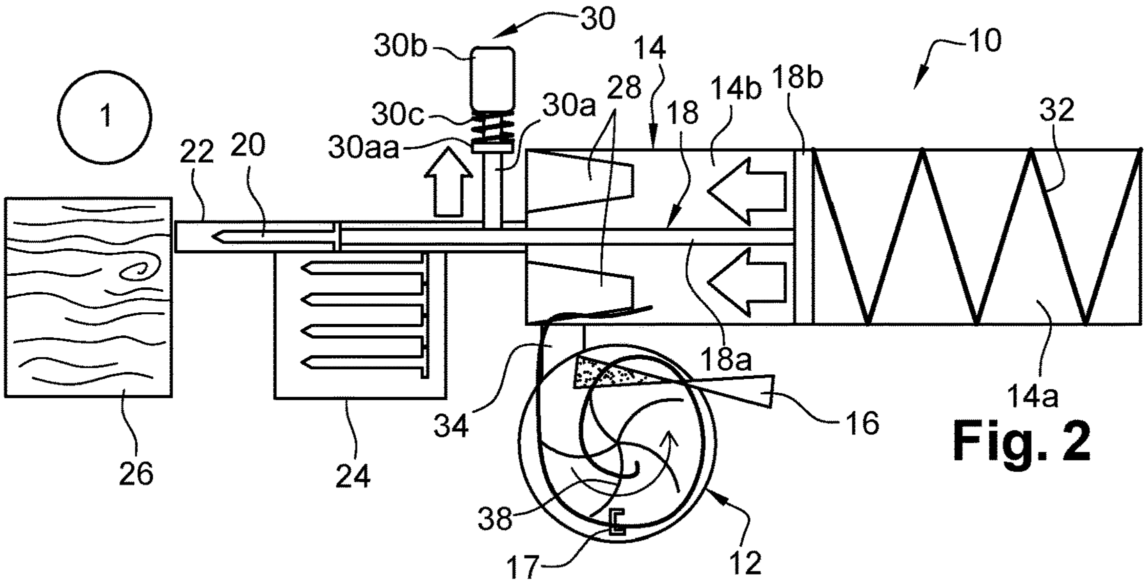
Figure 4:
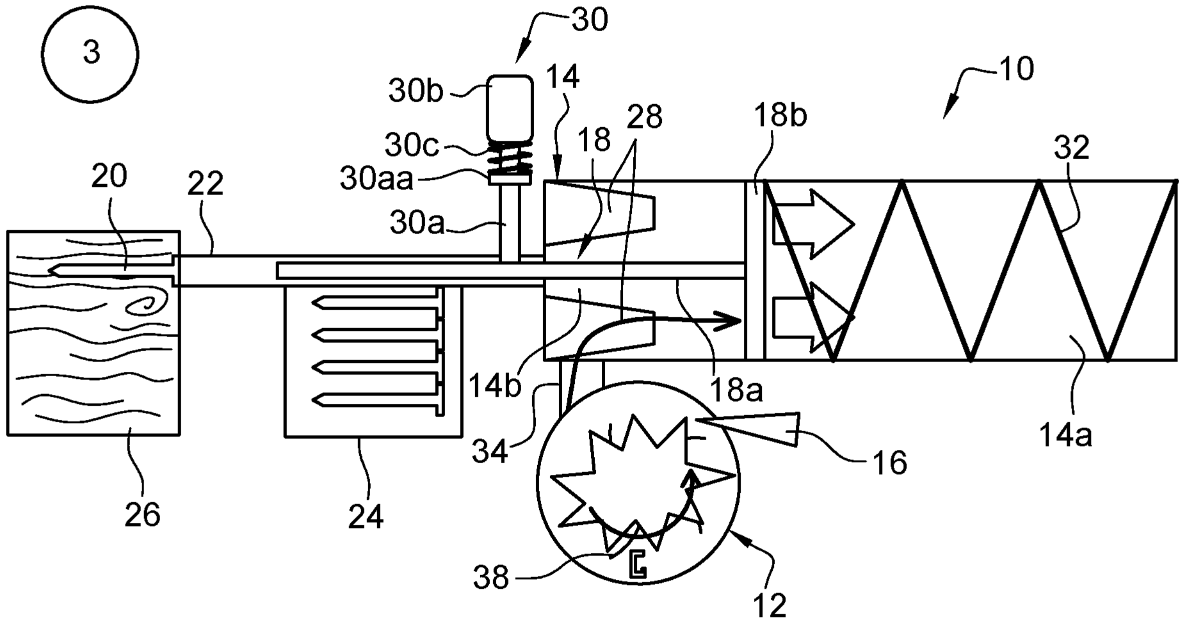

In FIG. 1, the piston 18 is immobilized in its rest position by the element 30. When the element 30 moves and the piston 18 is therefore released, the member 32 drives the piston 18 from its rest position to the working and firing position (FIG. 2). The end of travel is defined by the abutments 28 which are able to bring about reverse elastic return of the piston (FIG. 3). The movement and the return to its rest position of the piston 18 are brought about in accordance with the present disclosure by a rise in pressure in the second portion 14*b* of the working chamber 14 by igniting an air-fuel mixture in the combustion chamber 12 (FIG. 4).

To this end, the combustion chamber 12 is in direct fluidic communication with the second portion 14*b*. A combustion gas outlet of the chamber 12 is connected here by a pipe 34 to an inlet of the second portion 14*b*. In the example shown, this inlet is situated at a forward end of the working chamber 14 at which the abutments 28 are situated.

The front end of the working chamber 14 advantageously further includes a vent 36 to the surrounding air and for possible evacuation of the combustion gases (FIG. 1).

The combustion chamber 12 may be any shape. In the example shown, it has a cylindrical general shape the axis of revolution of which is substantially perpendicular to the lengthwise axis of the piston 18. Alternatively, it could have a longitudinal orientation parallel to the piston 18. Moreover, in the example shown, it is disposed alongside the working chamber 14. It could alternatively be disposed around the latter and be coaxial with the chamber 14.

The pipe 34 opens into the chamber 12 in a substantially tangential direction so as to facilitate rotation of air coming from the chamber 14 in the chamber 12.

The combustion chamber 12 may include a propeller 38 or any other mechanism able to facilitate the mixing of air and fuel in the chamber 12 or to accentuate the phenomena of turbulence therein.

The propeller 38 may be fixed or mobile in rotation. In the latter case, the propeller 38 may be free to rotate or driven by a motor, for example an electric motor, or a turbine and also connected to the controller of the tool 10.

Figure 5:
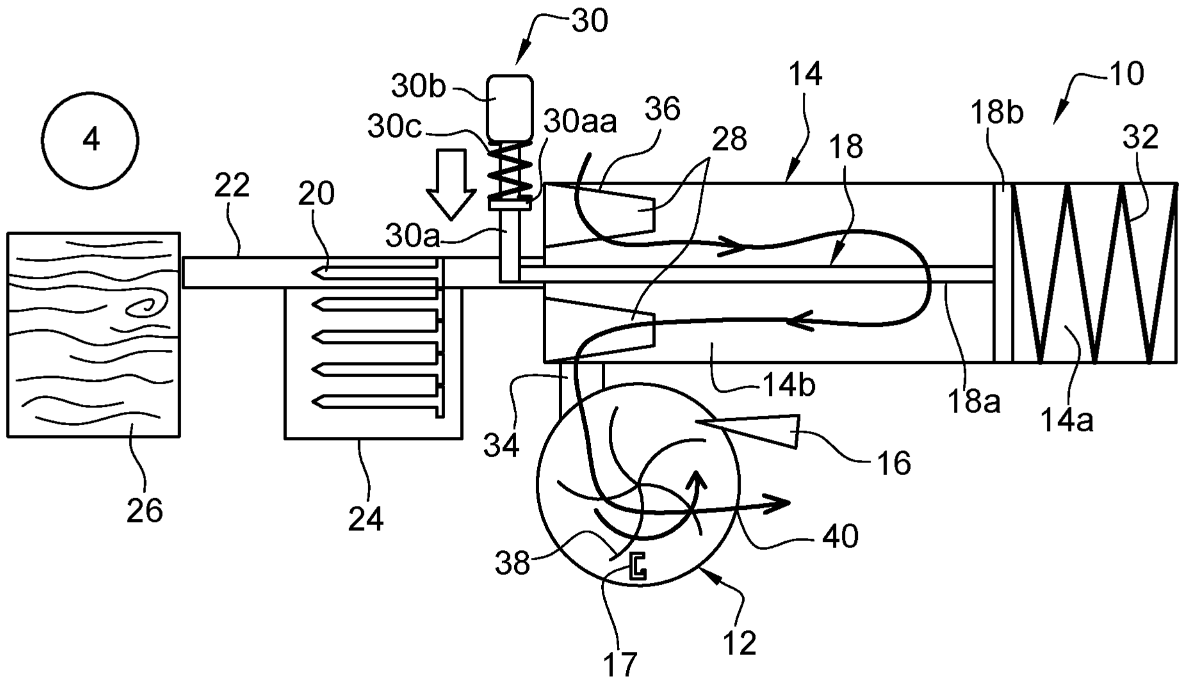

Upon firing, the piston 18 moves the air contained in the second portion 14*b* that is expelled from the working chamber 14 and feeds the combustion chamber 12. This air is caused to rotate or subjected to turbulence in the chamber 12 thanks to the propeller 38 and the fuel 16 is injected into the chamber 12 to be mixed with this air. When the piston 18 reaches its FIG. 3 working position, the controller of the tool is able to command the spark plug 17 to generate a spark and ignite the air-fuel mixture (FIG. 4). Ignition of the mixture generates combustion gases and a rise in pressure in the combustion chamber 12 and in the second portion 14*a* of the working chamber which communicates via the pipe 34 with the chamber 12. This pressure rise causes the piston 18 to move and to return to the rest position. The controller of the tool is then able to activate the finger 30 to return it to its position immobilizing the piston (FIG. 5). The return of the piston 18 to its rest position causes a reduced pressure in the second portion 14*b* of the working chamber 14 that generates the feeding of air to this portion 14*b* and the combustion chamber 12 via the vent 36. The combustion chamber 12 advantageously also includes a vent 40 for evacuating the combustion gases and vitiated purge air (FIG. 5). The vents 36 and 40 are preferably equipped with valves controlled by the controller of the tool.

Figure 6:
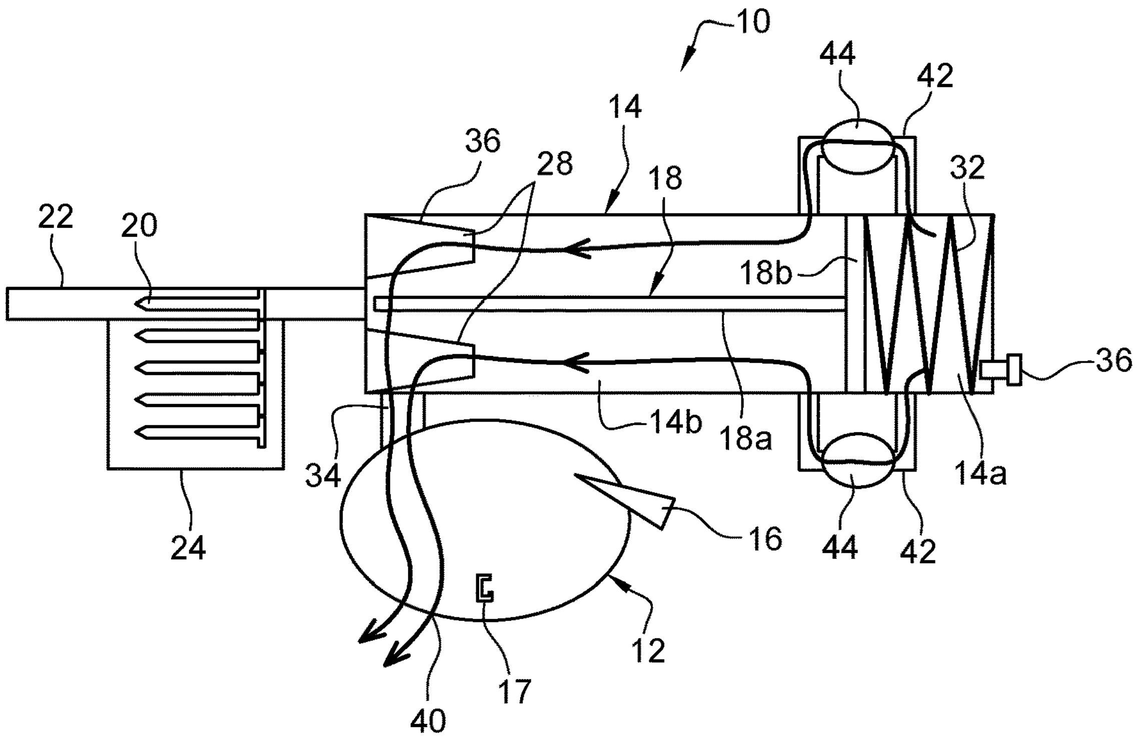
FIG. 6 is a view similar to those of FIGS. 1 to 5 showing a variant embodiment of the present disclosure.

FIG. 6 shows a variant embodiment of the tool.

Here the first and second portions 14*a* and 14*b* of the working chamber 14 are in fluidic communication via at least one pipe 42 equipped with a valve 44 and configured so that the air under pressure contained in the first portion 14*a* and resulting from the movement of the piston 18 to its rest position is at least in part evacuated into the second portion 14*b* and even into the combustion chamber 12 in order to purge that chamber 12. The valve or valves 44 is/are controlled by the controller of the tool 10.

In this variant embodiment, the combustion chamber is equipped with a vent 40 and the vent 36 of the working chamber may be situated at the level of its first portion 14*a*.

Figure 8:
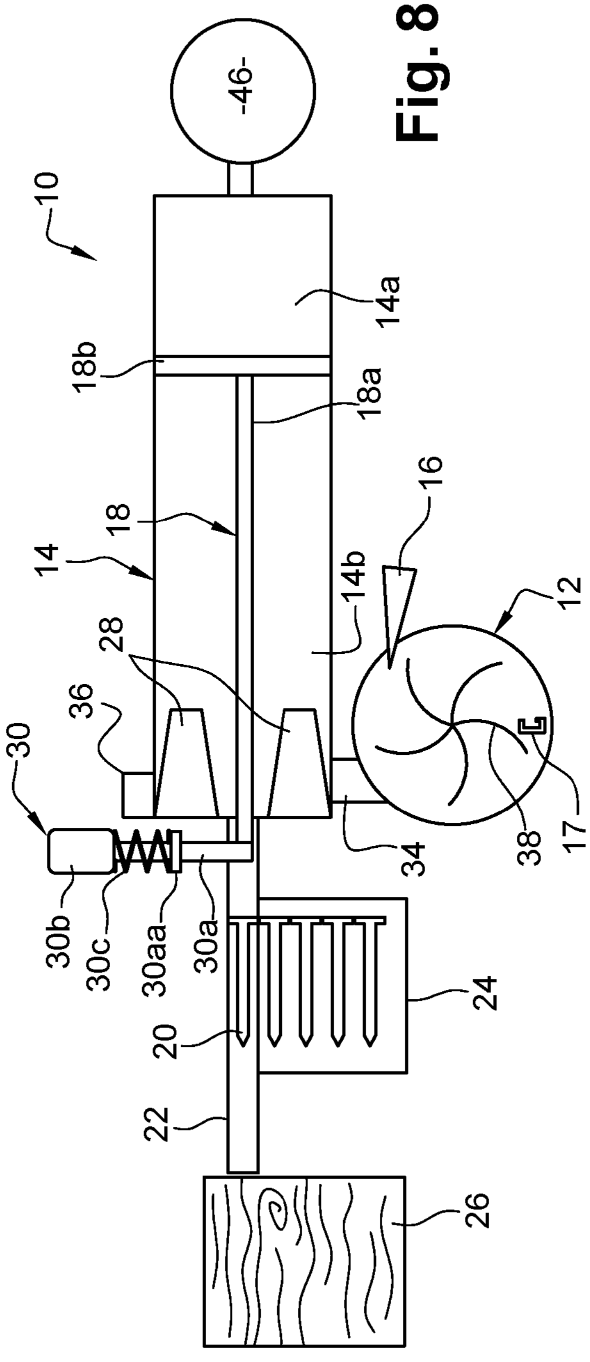
FIGS. 8 and 9 are views similar to those of FIGS. 1 to 5 showing other variant embodiments of the present disclosure.
Figure 9:
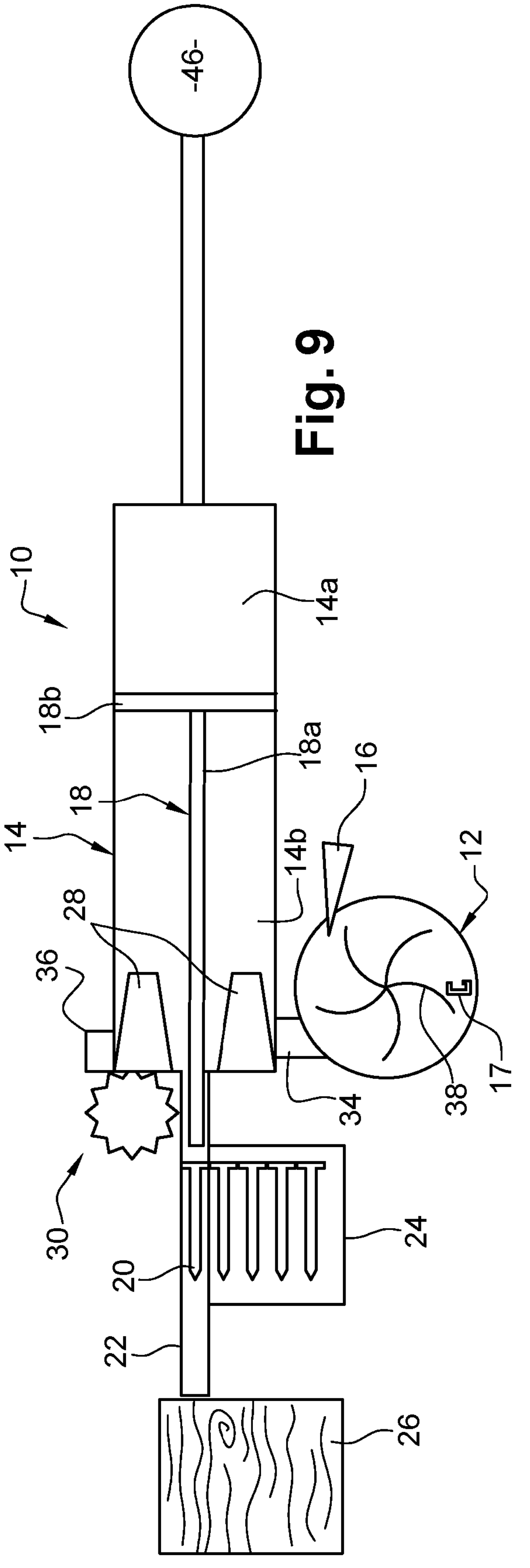

FIGS. 8 and 9 show other variant embodiments of the tool.

In these figures, firing is brought about by pneumatic energy which here is supplied by a source 46 of non-inflammable gas under pressure, such as compressed air for example.

The source 46 may be disposed in the vicinity of the working chamber 14 (FIG. 8) or remotely from the latter (FIG. 9).

Moreover, in FIG. 9 the member 30 includes a pinion that cooperates with a rack (not shown) carried by or formed on the rod 18*a* of the piston 18. The controller of the tool is able to command immobilization of the pinion against rotation in order to immobilize the piston 18 in its rest position and is able to leave the pinion free to rotate to allow movement of the piston during firing and returning to the rest position.

The invention claimed is:

1. A gas-operated fixing tool comprising:

a working chamber;

a piston slidably mounted in the working chamber and including a driving rod having a first longitudinal end configured to drive a first fixing element and a second longitudinal end connected to a head that separates the working chamber into a first portion and into a second portion that is traversable by the driving rod;

an elastically deformable member in the first portion of the working chamber, the elastically deformable member elastically compressible by the piston during movement of the piston to a rest position and elastically expandable to cause the piston to move from the rest position to drive the first fixing element;

a combustion chamber in fluid communication with the second portion of the working chamber such that a rise in pressure in the combustion chamber due to combustion of a mixture of air and fuel in the combustion chamber causes movement and return of the piston toward the rest position such that the driving rod is ready to drive a second fixing element, wherein the combustion chamber is not in fluid communication with the first portion of the working chamber; and a piston movement blocking element engageable with a front of the first longitudinal end of the driving rod in the rest position.

2. The gas-operated fixing tool of claim 1, which includes an elastic damping stop in the second portion and engageable by the piston after moving from the rest position.

3. The gas-operated fixing tool of claim 1, which includes a propeller in the combustion chamber.

4. The gas-operated fixing tool of claim 3, wherein the propeller is free to rotate or configured to be driven in rotation.

5. The gas-operated fixing tool of claim 1, which includes a spark plug partially in the combustion chamber.

6. The gas-operated fixing tool of claim 1, wherein one of the second portion and the combustion chamber include a vent configured to vent discharge combustion gases.

7. A gas-operated fixing tool comprising:

a working chamber;

a piston slidably mounted in the working chamber and including a driving rod having a first longitudinal end configured to drive a first fixing element and a second longitudinal end connected to a head that separates the working chamber into a first portion and into a second portion that is traversable by the driving rod;

an elastically deformable member elastically compressible by the piston during movement of the piston to a rest position and elastically expandable to cause the piston to move from the rest position to drive the first fixing element;

a combustion chamber and in fluid communication with the second portion such that a rise in pressure in the combustion chamber due to combustion of a mixture of air and fuel in the combustion chamber causes movement and return of the piston toward the rest position such that the driving rod is ready to drive a second fixing element, and wherein the combustion chamber is not in fluid communication with the first portion of the working chamber; and a piston movement blocking element engageable with a front of the first longitudinal end of the driving rod when the piston is in the rest position.

8. The gas-operated fixing tool of claim 7, which includes a spark plug partially in the combustion chamber.

9. A method of operating a gas-operated fixing tool having a working chamber and a piston including a driving rod having a first longitudinal end and a second longitudinal end connected to a head that separates the working chamber into a first portion and into a second portion, said method comprising:

moving the piston in the working chamber from a rest position to a driving position to drive a first fixing element;

causing a blocking element to hold a front of the first longitudinal end of the drive rod when the piston is in the rest position in the working chamber;

causing the blocking element to release the drive rod to enable moving the piston in the working chamber;

elastically expanding an elastically deformable member to cause the moving of the piston from the rest position to the driving position to drive the first fixing element; and combusting a mixture of air and fuel in a combustion chamber and fluidly communicating a rise in pressure caused by the combustion to the second portion to cause movement and return of the piston toward the rest position such that the driving rod is ready to drive a second fixing element, wherein the combustion chamber is not in fluid communication with the first portion of the working chamber.

10. The method of operating a gas-operated fixing claim 9, which includes fluidly communicating gases expelled from the second portion of the chamber due to moving the piston in the working chamber from the rest position to the driving position into the combustion chamber to create turbulence in the combustion chamber.

* * * * *